April 28, 1964     A. R. KAYS ETAL     3,130,738
AUTOMATIC DETERGENT DISPENSER FOR DISHWASHING MACHINES
Filed April 18, 1961     2 Sheets-Sheet 1
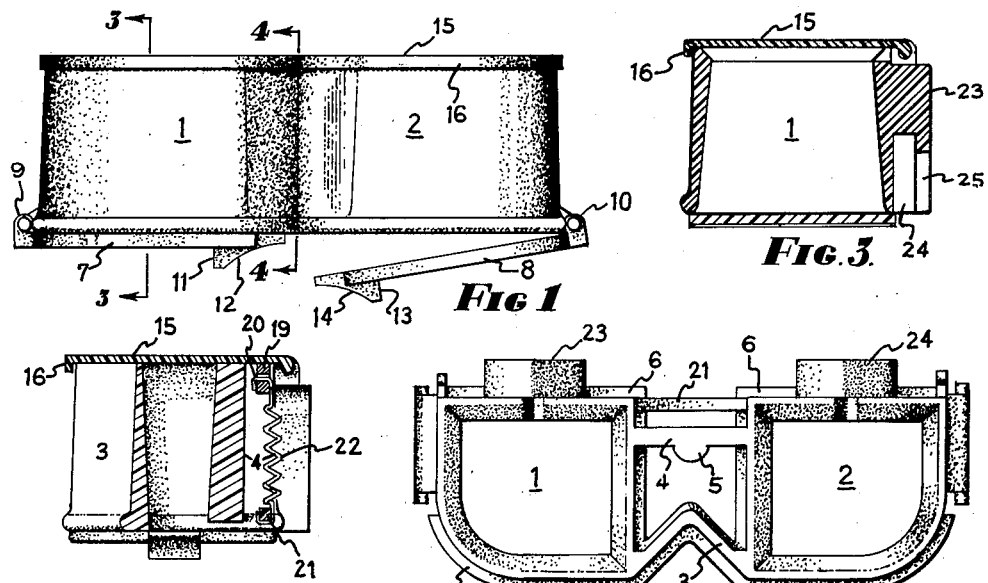
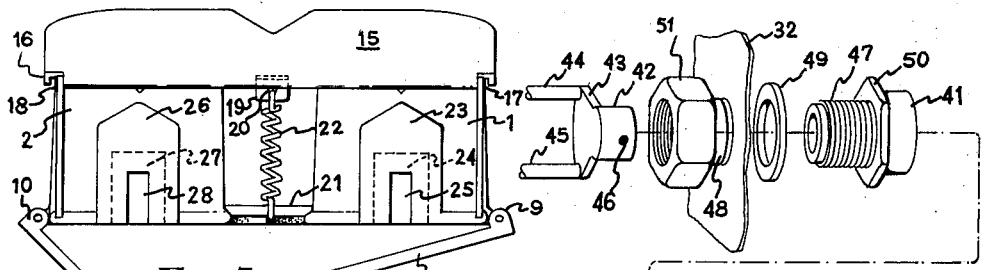
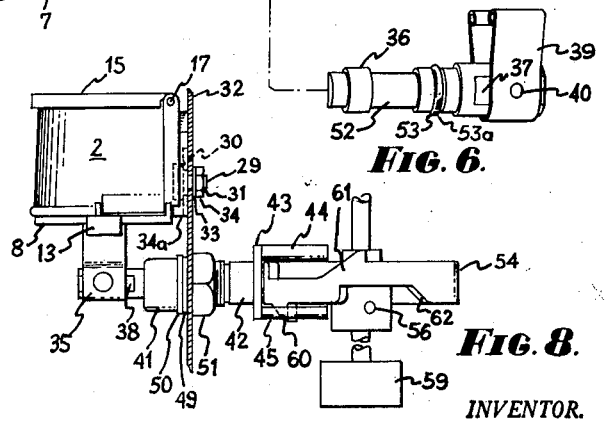
INVENTOR.
ARNOLD ROBERT KAYS,
CHARLES NELSON PERIN AND
BY CARL HENRY LINES,
*Allen & Allen*
ATTORNEYS.

April 28, 1964   A. R. KAYS ETAL   3,130,738
AUTOMATIC DETERGENT DISPENSER FOR DISHWASHING MACHINES
Filed April 18, 1961   2 Sheets-Sheet 2

INVENTOR.
ARNOLD ROBERT KAYS,
CHARLES NELSON PERIN AND
BY CARL HENRY LINES,

Allen & Allen
ATTORNEYS.

United States Patent Office 3,130,738
Patented Apr. 28, 1964

3,130,738
AUTOMATIC DETERGENT DISPENSER FOR
DISHWASHING MACHINES
Arnold Robert Kays, Charles Nelson Perin, and Carl
Henry Lines, Connersville, Ind., assignors to Design
and Manufacturing Corporation, Connersville, Ind., a
corporation of Indiana
Filed Apr. 18, 1961, Ser. No. 180,913
(Filed under Rule 47(a) and 35 U.S.C. 116)
11 Claims. (Cl. 134—58)

The invention relates to timer-controlled means for releasing measured quantities of detergent into the tub or vat of a dishwashing machine at intervals coinciding with desired parts of the cycle of operations of the machine.

It is an object of the invention to provide a simple dispensing container which may easily be filled by the operator of the machine.

It is an object of the invention to provide a dispensing container which although located within the vat or tub may easily be removed therefrom for cleaning and replacement, and which upon such removal is automatically disconnected from the timing means.

It is an object of the invention to provide in connection with a dispensing container, a simple timer connected operating means extending through the wall of the vat or tub.

It is an object to provide in connection with apparatus of the type referred to, an operating means of minimum bulk extending into the tub.

It is an object to provide a structure of this type in which the dispensing container may be reloaded for operation during subsequent cycles or parts of cycles without changing or adjusting the timing mechanism.

It is an object to provide a detergent dispenser, especially for top loading machines, which is easily inspected to determine whether it is loaded.

It is an object of the invention to provide a simple and inexpensive detergent dispenser capable of supplying a plurality of increments of detergent material at selected parts of a cycle.

This and other objects of the invention which will be set forth hereinafter or will be apparent to one skilled in the art upon reading these specifications, are accomplished by that structure and arrangement of parts of which an exemplary embodiment will now be described. Reference is made to the accompanying drawings wherein:

FIG. 1 is a front elevational view of the dispensing container.

FIG. 2 is a top plan view of the dispensing container with the lid and dispensing doors removed.

FIG. 3 is a sectional view taken along the section line 3—3 of FIG. 1.

FIG. 4 is a sectional view taken along the section line 4—4 of FIG. 1.

FIG. 5 is a rear elevational view of the dispensing container with the lid and doors open.

FIG. 6 is an exploded perspective view of the door release.

FIG. 7 is a perspective view of a cam wheel on a shaft connected with the timer.

FIG. 8 is an elevational view of the dispensing container, door release and timed cam wheel in assembled relationship.

Figure 9:
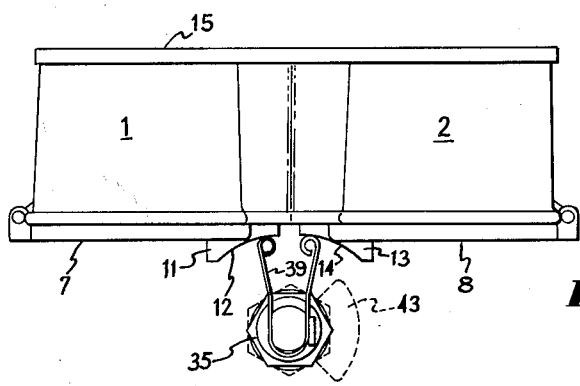
FIGS. 9, 10 and 11 are elevational views showing the successive action of the door release on the dispensing doors.

In an exemplary embodiment, a dispensing unit made of any suitable material such as plastic or metal comprises two hollow cups 1 and 2, open both at the top and bottom. The cups are joined together by a front wall member 3 which may be indented for added rigidity, and a rear wall member 4 which may have an enlarged central portion 5 for added strength. In the exemplary embodiment the wall members 3 and 4 are integral with the cups 1 and 2, the structure being formed as a molding or casting with wall sections as shown or of any other suitable configuration which will permit stripping from the mold. The individual cups are, of course, of a size to hold the desired increments of detergent for separate washing operations. A rim 6 extends at least partially around the outside bottom edge of the walls of each cup and along the bottom front edge of the wall 3 to add to the strength and rigidity of these walls.

The cups 1 and 2 are provided with bottom doors 7 and 8 respectively, swingably mounted by hinging means to the right and left ends respectively of the dispensing unit as seen in FIG. 1. The hinging means may be of any type known in the art. When the dispensing unit is made of a plastic material the hinging means may be of the "snap-in" type, as is generally indicated by the index numerals 9 and 10 in FIG. 1.

As shown in FIG. 1, the bottom door 7 is provided with an integral release tab 11 which extends beyond the edge of the door, and presents a concave lower surface 12. The door 8 is provided with a similar release tab 13 having a concave surface 14.

A single unitary lid member 15 with a downwardly depending lip 16 along its front and side edges (FIGS. 3 and 4) serves as a cover for both cups 1 and 2. The lid member may be swingably mounted along the rear edge of the dispensing unit by any suitable hinging means. In the exemplary embodiment, a hinge of the "snap-in" type is indicated generally by the index numerals 17 and 18 (FIGS. 5 and 8).

A downwardly depending lug 19 with a perforation 20 is located on the inside surface of the lid member 15 near its rear edge. A brace member 21 extends between the cups 1 and 2 at their lower edges and behind the rear wall member 4. A spring 22 has its lower end hooked about the brace member 21 and its upper end engaged in the perforation 20 in the lug 19. The action of the spring 22 is to hold the lid member 15 in a closed position over the cups 1 and 2 to prevent entry of water.

The dispensing unit may be mounted on an inside wall of the tub or vat of a dishwashing machine by any suitable means. In the exemplary embodiment the rear wall of cup 1 has an integral mounting bracket 23 with a rectangular cavity 24 and a slot 25 therein. The rear wall of cup 2 carries a similar integral mounting bracket 26, with a cavity 27 and slot 28.

Mounting lugs for the dispensing unit may be located on the inside surface of a wall of a dishwashing machine, preferably the rear wall. One such mounting lug is shown in FIG. 8. The mounting lug 29 with a rectangular head 30 and threaded shank 31 is affixed and sealed to the rear wall 32 of the dishwashing machine by means of a washer 33 and a nut 34. The head 30 of the mounting lug is held away from the rear wall 32 by a spacer 34a. The dispensing unit is removably mounted on the rear wall by engaging the mounting lugs in the mounting brackets. As shown, the head 30 of the mounting lug slides into the cavity 27 (FIG. 5) and the spacer 34 slides in the slot 28 of the mounting bracket 26.

A release means, generally indicated by the index numeral 35, is shown in FIGS. 6 and 8. A shaft 36 with flattened sides 37 and 38 at its right end as seen in FIG. 6, carries a U-shaped resilient member 39 at that end. The resilient member is held in place by a rivet 40. The shaft 36 is rotatably mounted in a bushing 41. A fitment 42 with an extended portion 43 bearing two cam followers 44 and 45 is affixed by means of a set screw 46 to the left end of the shaft 36, which end is of reduced diameter. The bushing 41 is externally threaded as at 47. The threaded portion of the bushing passes through a hole 48 in the rear wall 32 of the dishwasher. A washer 49 between the rear wall 32 and an annular extended portion 50 of the bushing 41 prevents escape of water and steam from the interior of the tub or vat through the hole 48. A nut 51 holds the bushing 41 and washer 49 securely in place. That portion of the shaft 36 which is located within the bushing 41 has a central portion 52 of reduced diameter to minimize friction within the bushing, and a narrow annular groove 53 for receipt of an O-ring 53a.

An actuating cam wheel 54 made of any suitable substance such as metal, hard rubber or plastic is illustrated in FIGS. 7 and 8. The cam wheel is non-rotatably affixed to a flattened portion of a shaft 55 by means of a set screw 56. The shaft is located behind the rear wall 32 of the vat or tub of the dishwashing machine and is connected to a timing mechanism generally indicated at 59. The cam wheel is provided with a plurality of cam surfaces 60, 61 and 62 on an annular rim 63, which coact with the cam followers 44 and 45 (FIG. 8) as hereinafter described.

The term "detergent" as used herein is intended to embrace any material which will be employed in water solution or suspension during a washing cycle of the apparatus, whether this material consists essentially of inorganic salts having water softening and other functions, or whether it contains or consists of surface-active materials having a detergent function, such as soap, or non-soap synthetics, or of substances containing both inorganic salts and surface-active materials. The detergents for use in connection with the apparatus of this invention will be water-soluble substances in powdered or granular form.

It will be understood by the skilled worker in the art that the operations of dishwashing machines include various washing cycles, rinsing cycles, and drying cycles. The specific steps performed by the machine may be selectable by the operator by means of control devices; but the timing is accomplished and the order of performance of the steps is determined by one or more timing devices which are mechanical or electrical in nature. Many dishwashing machines are arranged so that they can perform a plurality of separate washing operations with intermediate rinsings. Since a washing cycle requires the presence of a detergent, the apparatus of this invention is preferably arranged so that it can dispense a plurality of increments of detergent substance at different selected times.

Figure 10:
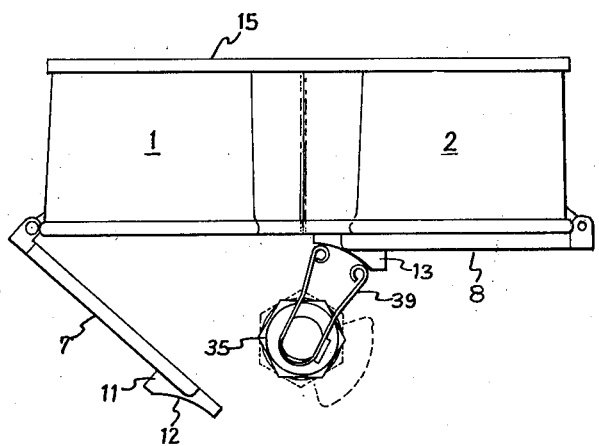
Figure 11:
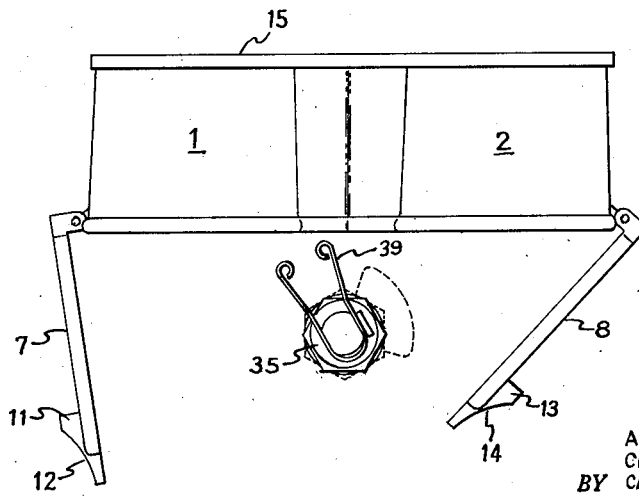

Briefly in the operation of the structure of this invention (reference is made to FIGS. 8 through 11) the operator lifts the lid member 15 of the dispensing unit and fills the cups 1 and 2 with detergent material. At the beginning of the cycle the bottom plates 7 and 8 are held in a closed position by the U-shaped member 39 of the release means 35, the two arms of which bear against the release tabs 11 and 13 of the doors, holding them closed. The dishwashing machine is then loaded with dishes and the desired cycle is selected. The timer controlled cam wheel 54 is set in motion, rotating in a clockwise direction as seen in FIG. 8. At a predetermined time in the cycle the cam surface 60 coacts with the cam follower 45 causing the release means 35 to tilt in a clockwise direction, thereby releasing tab 11 and bottom door 7, discharging cup 1 (FIG. 10). After a predetermined interval of time the rotation of the cam wheel 54 causes cam surface 61 to coact with cam follower 44, tilting the release means in a counterclockwise direction, releasing tab 13. Bottom door 8 then swings downwardly discharging the contents of cup 2 (FIG. 11).

After another predetermined time interval, the cam wheel 54 will have rotated so that the cam surface 62 coacts with the cam follower 45 causing the release means 35 to resume the vertical position shown in FIG. 9. Despite the vertical position of the release means the now open bottom doors may be closed because the resilient character of the release means permits the release tabs of the doors to be snapped past the parts 39 to the position shown in FIG. 9. The dispensing unit is then ready to be filled again with detergent substance in preparation for another cycle. If an initial cycle is chosen having but one washing operation, the door 7 may be closed and cup 1 refilled after the cycle, even though cup 2 remains filled with detergent.

The filling of the dispensing unit requires no adjustment of the timing means. It is easy to determine whether or not the dispensing unit is filled by lifting the lid 15. The detergent in the cups is protected from the water in the vat or tub until the bottom doors open. Yet at any time the dispensing unit may be removed from the machine for cleaning, and its disconnection from the timing means is automatic.

Modifications may be made in the invention without departing from the spirit of it. The invention having been described in an exemplary embodiment, what is claimed as new and desired to be secured by Letters Patent is:

1. In a dishwashing machine or like structure having a tub with walls, the improvement comprising a detergent dispenser having a member open both at the top and bottom and providing a plurality of cups, a hinged lid means, and hinged bottom doors for said cups, means for supporting said dispenser on a wall of said tub, latch means for holding said bottom doors in closed position, and timer-actuating means for rotating said latch means whereby to allow said bottom doors to open sequentially by gravity, releasing detergent from said cup member.

2. The improvement claimed in claim 1 wherein said dispenser is removably attached to an inside wall of said tub.

3. The improvement claimed in claim 1 wherein said latch means is mounted on a shaft passing through a wall of said tub, and including timer-controlled means for rotating said shaft.

4. The improvement claimed in claim 3 wherein said latch means is a resilient member permitting manual closing of said bottom doors when said latch means has returned to its starting position.

5. In a dishwashing machine or like structure, a detergent dispenser comprising a member shaped to provide a plurality of cups, each cup being open both at the top and bottom, a hinged lid means for said cups, and separate, hinged bottom doors for said cup members, said bottom doors having free ends approaching each other, latch means for holding said bottom doors in closed position, timer-controlled means for moving said latch means first in one direction and then in another, whereby said latch means releases said bottom doors sequentially, allowing them to open by gravity and release detergent from said cup members.

6. The dispenser claimed in claim 5 wherein said timer-controlled means for moving said latch means comprises a shaft extending through a wall of said dishwashing machine, and means for rocking said shaft, said latch means being mounted on said shaft.

7. The dispenser claimed in claim 6 wherein said latch means comprises spaced resilient members deflectable by said bottom doors upon manual closure of said doors.

8. The dispenser claimed in claim 7 including a second shaft, cam means on said second shaft, and a cam follower on said first mentioned shaft coacting with said cam means, said cam means being so shaped as to rock said first mentioned shaft first in one direction and then in another.

9. The dispenser claimed in claim 8 wherein said cup members form a unit removably attached to an inside wall of the tub of said dishwashing machine.

10. In a dishwashing machine or like structure, a tub having vertical walls, a timer outside said tub, said timer having a shaft, a cam on said shaft rotating therewith, a second shaft passing through a wall of said tub, said second shaft bearing a cam follower outside said tub coacting with said cam, and a latch means inside said tub, said cam means acting upon rotation of said first shaft to rock said second shaft first in one direction and then in another, and a unitary structure inside said tub presenting a pair of cup members open at both the top and bottom, a common hinged lid means for said cup member, and hinged bottom doors for said cup members, said bottom doors having free approaching edges coacting with said latch member and adapted to be released thereby in sequence upon the rocking of said second shaft, and means for supporting said cup members within said tub in a position such that the bottom doors thereof will be held closed by said latch member when in an intermediate position.

11. The structure claimed in claim 10 wherein said latch member is a resilient member having spaced operating arms.

References Cited in the file of this patent
UNITED STATES PATENTS

| | | |
|---|---|---|
| 1,733,905 | Randolph | Oct. 29, 1929 |
| 1,898,543 | Johnson | Feb. 21, 1933 |
| 1,987,068 | Lenz | Jan. 8, 1935 |
| 2,189,213 | MacDonnell | Feb. 6, 1940 |
| 2,522,242 | Wagner | Sept. 12, 1950 |
| 2,939,612 | Thompson | June 7, 1960 |
| 3,038,640 | Braga | June 12, 1962 |
| 3,038,641 | Buzicky et al. | June 12, 1962 |